US011882959B1

(12) United States Patent
Eide

(10) Patent No.: US 11,882,959 B1
(45) Date of Patent: Jan. 30, 2024

(54) INTERACTIVE BEVERAGE SYSTEM AND METHOD

(71) Applicant: Johan Eide, Sebastopol, CA (US)

(72) Inventor: Johan Eide, Sebastopol, CA (US)

(*) Notice: Subject to any disclaimer, the term of this patent is extended or adjusted under 35 U.S.C. 154(b) by 0 days.

(21) Appl. No.: 18/105,858

(22) Filed: Feb. 5, 2023

(51) Int. Cl.
*A47J 31/44* (2006.01)
*A47J 31/52* (2006.01)
*G06K 19/06* (2006.01)

(52) U.S. Cl.
CPC ......... *A47J 31/521* (2018.08); *A47J 31/4492* (2013.01); *G06K 19/06028* (2013.01); *G06K 19/06009* (2013.01)

(58) Field of Classification Search
CPC .......... A47J 31/4492; G06K 19/06009; G06K 19/06028; G06K 19/06037
See application file for complete search history.

(56) References Cited

U.S. PATENT DOCUMENTS

| 8,138,922 | B2 | 3/2012 | Lindsay et al. |
| 8,998,097 | B2 | 4/2015 | Auniainen |
| 2006/0132311 | A1 | 6/2006 | Kruest et al. |
| 2008/0272916 | A1 | 11/2008 | Breysse et al. |
| 2009/0212954 | A1 | 8/2009 | Adstedt et al. |
| 2015/0238043 | A1* | 8/2015 | Agon ..................... B65D 85/72 99/295 |
| 2017/0099981 | A1* | 4/2017 | Haidar ................. B67D 1/0888 |
| 2020/0342463 | A1* | 10/2020 | Whittington ............ G06F 16/53 |
| 2021/0011446 | A1* | 1/2021 | Anderson ........ G06K 19/06037 |

FOREIGN PATENT DOCUMENTS

| DE | 102019101535 A1 * | 7/2020 | .......... A47J 31/4492 |
| WO | WO-2013150091 A1 * | 10/2013 | .......... A47J 31/4492 |
| WO | WO-2020037406 A1 * | 2/2020 | ............ A47J 31/402 |

* cited by examiner

*Primary Examiner* — Reginald Alexander
(74) *Attorney, Agent, or Firm* — Johan Eide; Christopher Pilling; My Patent Guys

(57) ABSTRACT

The present invention relates to an interactive beverage system and method comprised for the consumption of a beverage sample by a user before purchasing more of the same or a similar beverage. The interactive beverage system and method provide the user with a beverage data allowing the user to learn about nutritional facts, production details, ingredients, how the beverage was made, interact with the beverage manufacturer, and much more by positioning digital processing devices in various positions relative to a linking article. The linking article of the present invention serves to transmit, actively or passively, an input to the user's digital processing device resulting in a beverage data being displayed to the user.

19 Claims, 20 Drawing Sheets

INTERACTIVE BEVERAGE SYSTEM AND METHOD

BACKGROUND

1. Field of the Invention

The present invention relates to an interactive beverage system and method.

2. Description of Related Art

Traditionally purchasing of beverages is conducted in person, over the phone or remotely online. Exemplary beverage purchasing, such as wine purchasing, is commonly conducted by customers on-site at a winery, a liquor store, or online at an eCommerce wine store. Commonly the customer is asked to purchase a large format or volume of a beverage before tasting it. Consumers purchasing behavior is linked highly to having a history with a product. Beverages are no different and are highly preferential, wherein the likelihood of purchase has been shown to increase if the consumer has previously tasted and enjoyed the beverage before.

Further, technology is underutilized in advertising and educating customers about the beverage they are consuming. Beverage manufactures, wholesalers and retailers have no way of knowing when a beverage is consumed after the sale, therefore they are left with no way of knowing when to sell the consumer more beverages. Many marketing efforts produce minimal results if the consumer being marketed has no desire for more products.

With the success of services such as Amazon 1-click checkout and shipping, —placing a minimal amount of burden on the customer has become more and more appealing to the general public. Consumers' attention span has never been lower and patience for long load times, multiple technological steps, or re-directs to other websites are becoming less and less tolerable by the consumer.

A solution is needed to provide an interactive beverage-tasting experience wherein the customer can control their experience. A solution is also needed for identifying when a consumer starts a beverage-tasting experience and when to re-target the same customer through comprehensive marketing efforts. Lastly, a solution is additionally needed for placing minimal burden or extra steps on the consumer when attempting to re-purchase, especially if the purchase requires 2-factor authentication or age limit verification.

SUMMARY

The present invention relates to an interactive beverage system and method comprised for the consumption of a beverage sample by a user before purchasing a larger volume of the beverage. The interactive beverage system and method provide the user with a beverage data allowing the user to learn about nutritional facts, production details, ingredients, how the beverage was made, interact with the beverage manufacturer, and much more by positioning digital processing devices in various positions relative to a linking article. The linking article of the present invention serves to transmit, actively or passively, an input to the user's digital processing device resulting in, without limitation, a prompt, URL, or notification containing the beverage data. In doing so, the user is presented with a lower upfront cost, a beverage sample, and a beverage data with more information on the beverage sample.

One object of the present invention is to provide a unique identifier associated with the linking article to issue unique identification of each interactive beverage capsule during production. Another object of the present invention is to provide a unique identifier associated with the linking article to issue unique identification of the user and associate that unique identifier with a customer profile.

Another object of the present invention is to associate, record, and transmit a time stamp associated with the input being transmitted to the central server computer or the digital processing device. In doing so, marketing efforts may be sent to the user of the interactive beverage capsule at predetermined times derived by a computer system or at the discretion of the beverage supplier.

In order to do so, a capsule is provided having at least one beverage sample within. A linking article, such as a NFC-tag or RFID tag, is adjoined to the capsule. A unique identifier is then associated with the linking article. When a user positions a digital processing device, such as a smartphone, in the proximity of the linking article a input is transmitted to the digital processing device triggering a beverage data to be displayed to the user. The unique identifier is transmitted to at least one of the following: a digital processing device, a network and a central server computer to record the action and the time of the user moving the digital processing device within proximity of the linking article. Last, a beverge data may be downloaded, received, or generated by the processor of the digital processing device to use in association with the beverage sample of the beverage during consumption by the user.

Additionally, a beverage package system is provided having a capsule that has a portion and a lower portion adjoined to one another removably. Within the lower portion, at least one aperture extends into the lower portion substantially sized to securely hold at least one beverage sample. Adjoined or within any portion of the capsule is a linking article having a unique identifier. Next, a digital processing device having a display screen is present to use with the linking article as desired by the user. During exemplary operation, a user positions the digital processing device near the linking article to display a prompt or a beverage data on the display screen of the digital processing device.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Figure 1:
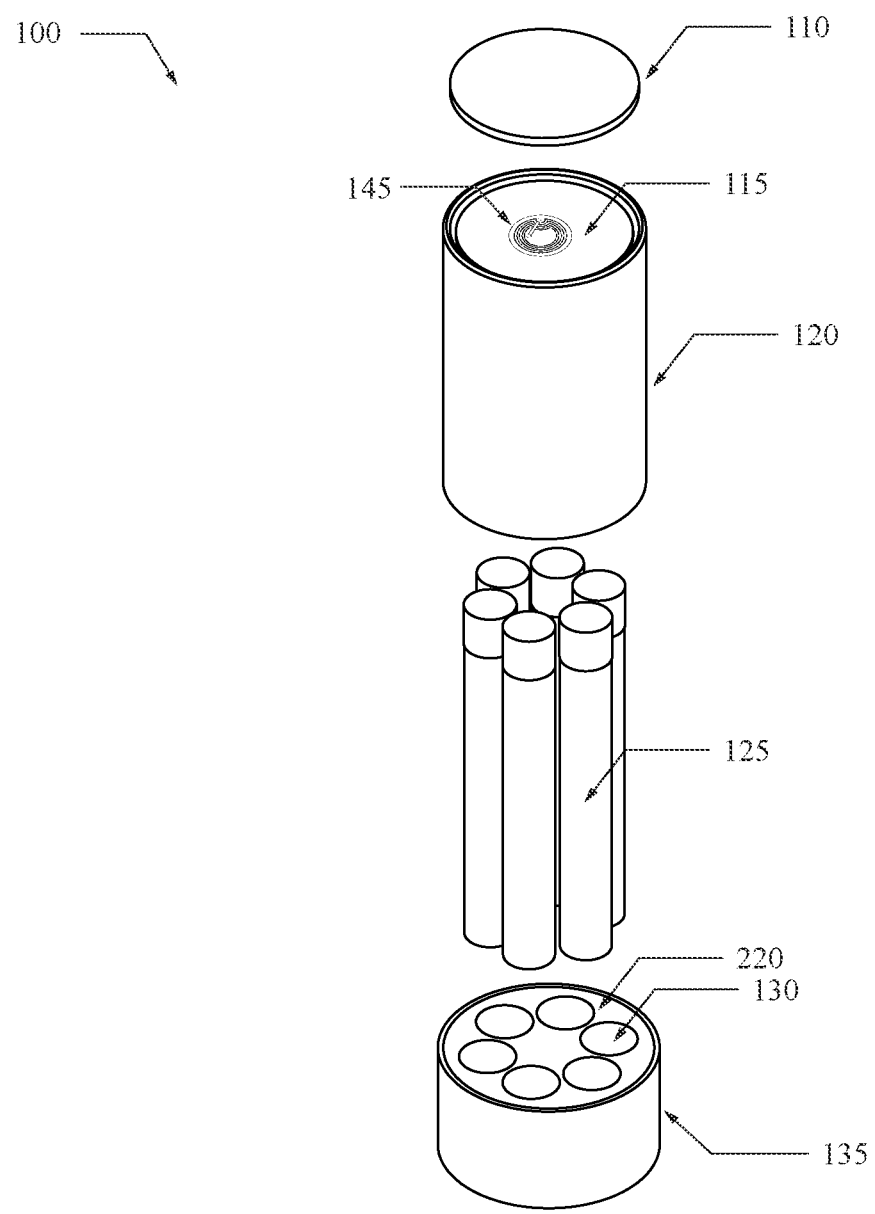
FIG. 1 shows an exemplary isometric view of one embodiment of the interactive beverage system and method.

As shown in FIG. 1, a interactive beverage system 100 is provided having a capsule 101 that has an upper portion 120 and a lower portion 135. During assembly, the upper portion 120 of the capsule 101 is removably adjoined to the lower portion 135 enclosing at least one beverage sample 125 of a beverage 170 within. In some embodiments, an alignment protrusion 166 may extend outward from the upper portion 120 or the lower portion 135 of the capsule 101 to aid in the assembly, concentric alignment and orientation the capsule 101 during assembly. To hold the at least one beverage sample 125 of the beverage 170 within the capsule 101 at least one aperture 130 may be provided in certain embodiments and may extend into the lower portion 135. In some embodiments, the lower portion 135 may further comprise a lower insert 220 removably adjoined within a lower portion aperture 225 of the lower portion 135 of the capsule 101. The lower portion 135 or the lower insert 220, without limitation, may be constructed of foam, cardboard, metal, dry pulp or wet pulp to form the lower portion aperture 225, rigid or moldable, to hold the at least one beverage sample 125 within.

Figure 2:
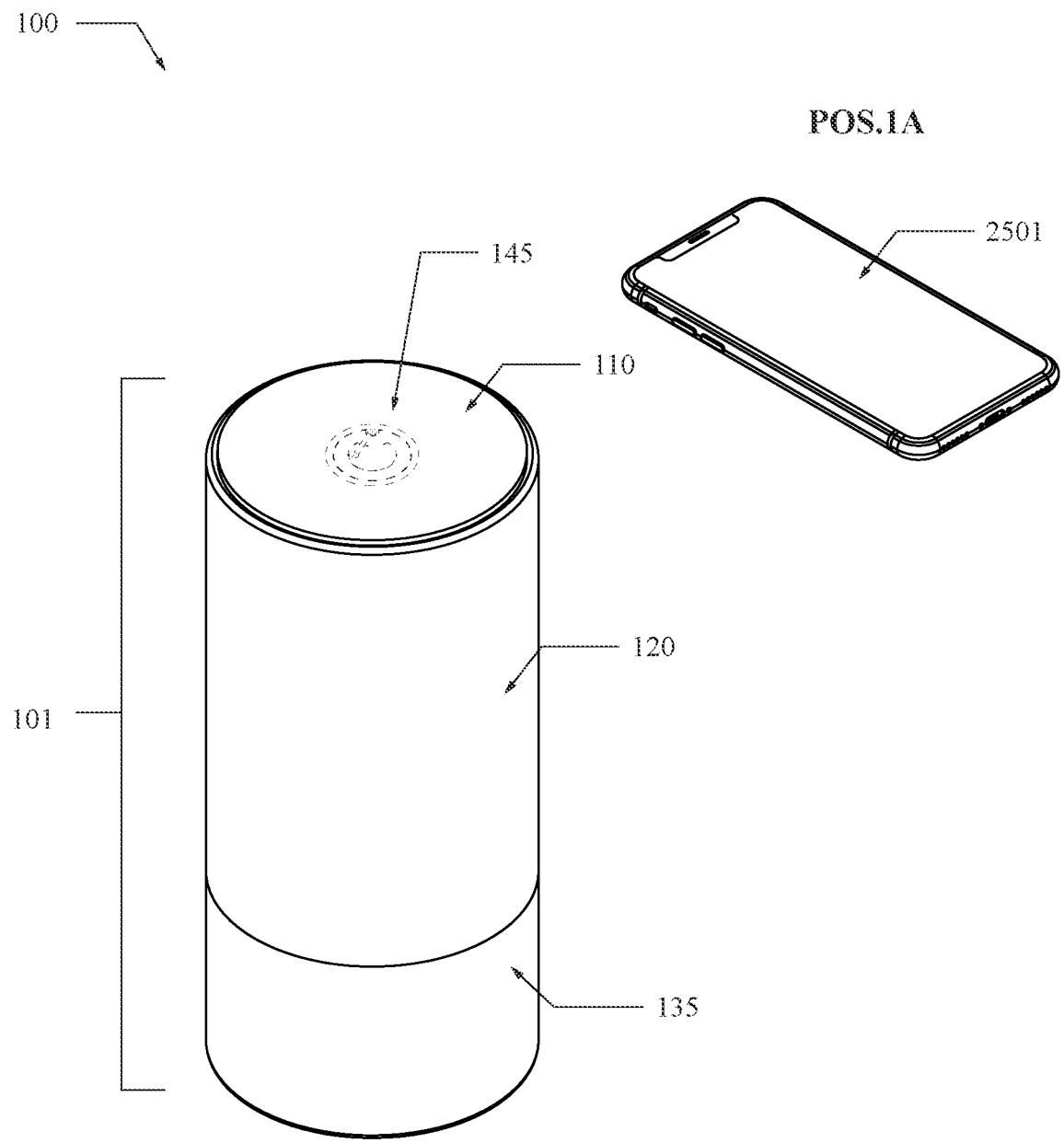
FIG. 2 shows an exemplary isometric view of one embodiment of the interactive beverage system and method.
Figure 3:
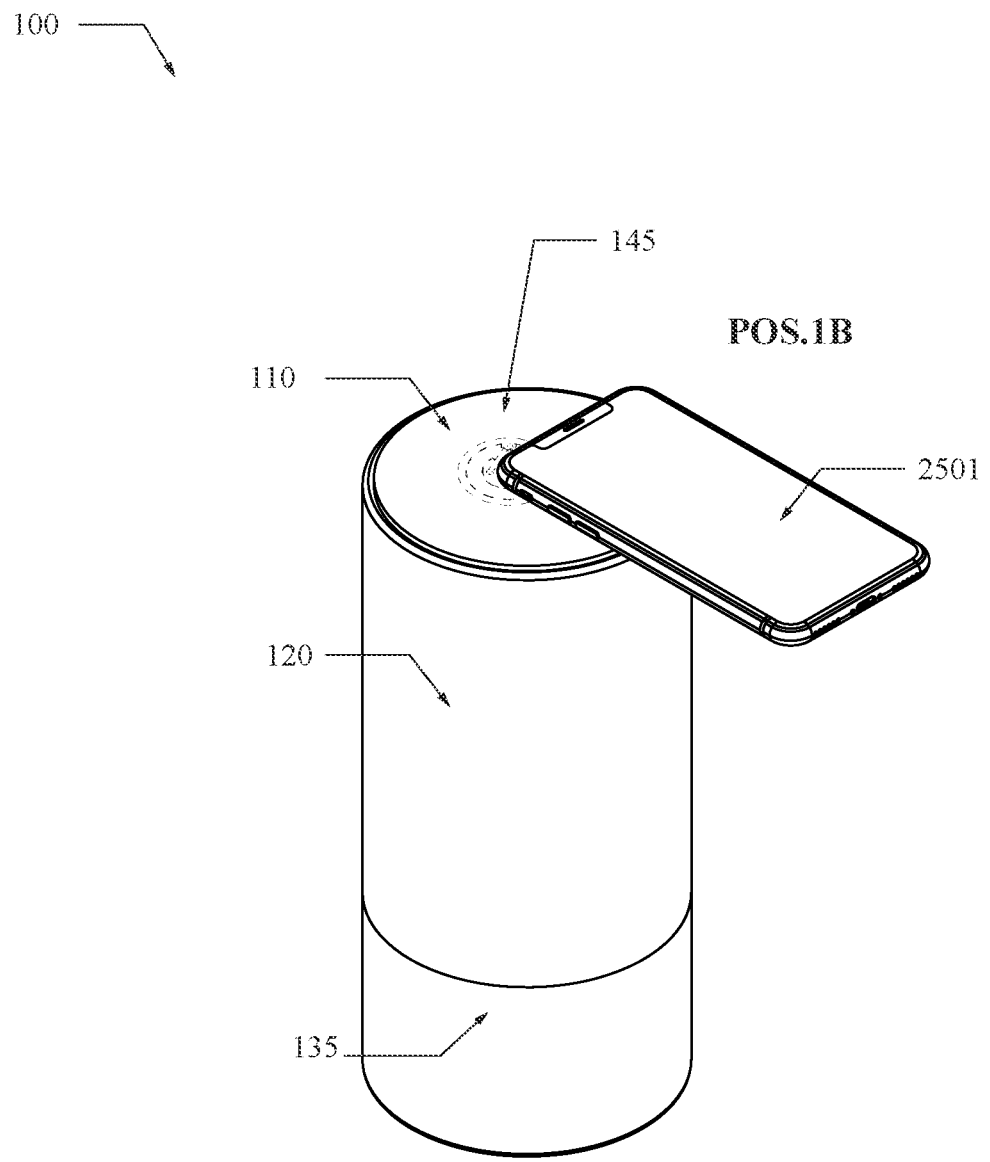
FIG. 3 shows an exemplary isometric view of one embodiment of the interactive beverage system and method.

As shown in FIGS. 2 and 3, a linking article 145 may be adjoined to any portion of the capsule 101 for the purpose of providing an input, active or passively induced, to a processor of a digital processing device 2501. The linking article 145 may comprise, without limitation, a unique identifier programmed or embedded within for the purpose of differentiating the linking article 145 and therein differentiating the capsule 101 that the linking article 145 is adjoined to. In the present embodiment, without limitation, the linking article 145 is shown as an NFC tag. For example, in the present invention, the linking article 145 is an NFC tag having the unique identifier stored as binary code within the NFC tag at the time of manufacture. In the present embodiment, the digital processing device 2501 is shown as a smartphone having a display screen 142. Those skilled in the art will recognize many suitable technologies for the transmission of the input from the linking article 145 to the digital processing device 2501.

During exemplary use of the interactive beverage system 100, a user 195 moves the digital processing device 2501 from a distal position POS.1A to a proximal position POS.1B to initiate transmission of the input from the linking article 145 to the digital processing device 2501. In the present embodiment, the input comprises a code to initiate the beverage data 141 on the display screen 142 of the digital processing device 2501 to draw the attention of the user 195. The beverage data 141, without limitation, may be designed to provide multiple engagement points with the user 195 on the digital processing device 2501 and more information related to the beverage sample 125 or the beverage 170. In other embodiments, depending upon the linking article 145 chosen to accomplish the wireless transmission of the input, the beverage data 141 may comprise at least one of the following: text, images, HTML, a URL, a program, a sequence of instructions, a mobile applciation or an executable code.

In other exemplary embodiments, the linking article 145 may comprise at least one of the following: a passive NFC tag, an active NFC tag, a QR code, an RFID tag, a Bluetooth module, a radio module, a satellite module, a microwave communication module, a Wi-Fi module, a radar module, a sonar modular, an alphanumeric symbol, a letter, a number, a sound, an infrared sensor or any combination thereof. In some embodiments, the capsule 101 may include the digital processing device 2501 and the user 195 may move the linking article in proximity to the digital processing device 2501 to exchange the input from the linking article 145 to the digital processing device 2501 the inverse of the presently shown embodiment in FIG. 1 and FIG. 2.

Figure 4:
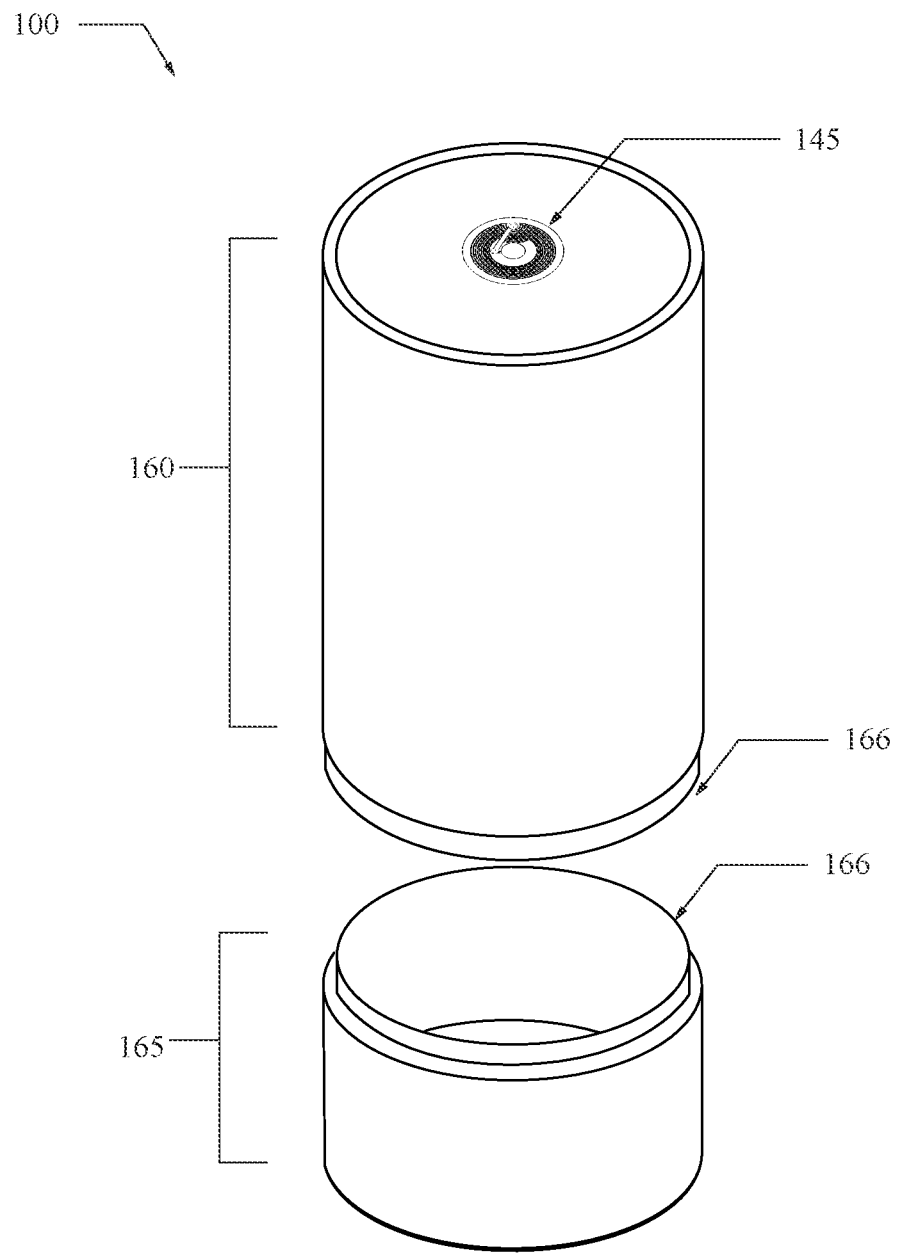
FIG. 4 shows an exemplary isometric view of one embodiment of the interactive beverage system and method.
Figure 5A:
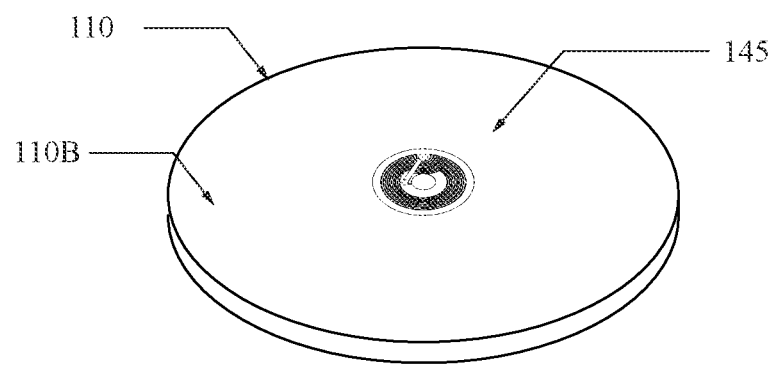
FIG. 5A shows an exemplary isometric view of one embodiment of the removable element of the interactive beverage system and method.

As illustrated in FIG. 4 and FIG. 5A the capsule 101 is shown as a cylindrical embodiment within the linking article 145 and is positioned on the tip of the capsule 101 for easy access by the user 195. In the exemplary embodiment in FIG. 4, the linking article 145 is shown adjoined to the upper portion 120 of the capsule 101. In another exemplary embodiment in FIG. 5A, the linking article 145 is shown adjoined to a removable element 110. Although the present embodiment of the capsule 101 of the interactive beverage system 100 is shown as cylindrical, no limitation is placed on the shape or size of the capsule 101 having the sample of the beverage 170 positioned within. Although the present embodiment of the removable element 110 of the interactive beverage system 100 is shown as a circular coaster to substantially match an indentation 115 of the upper portion 120 of the capsule 101, the present invention is in no way limited to a circular design for the removable element 110. In another illustrated exemplary embodiment in FIG. 5A, the linking article 145 is shown within the removable element 110.

Figure 5B:
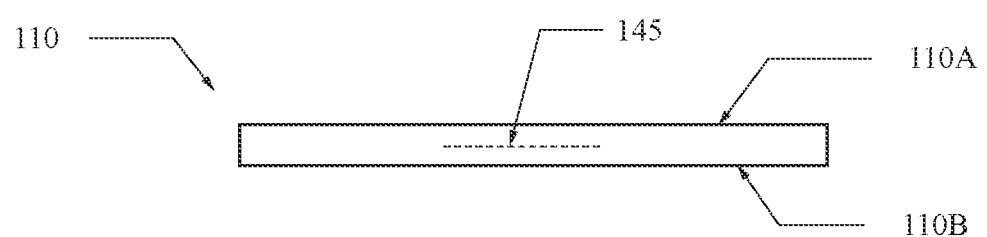
FIG. 5B shows an exemplary side view of one embodiment of the removable element of the interactive beverage system and method.
Figure 6A:
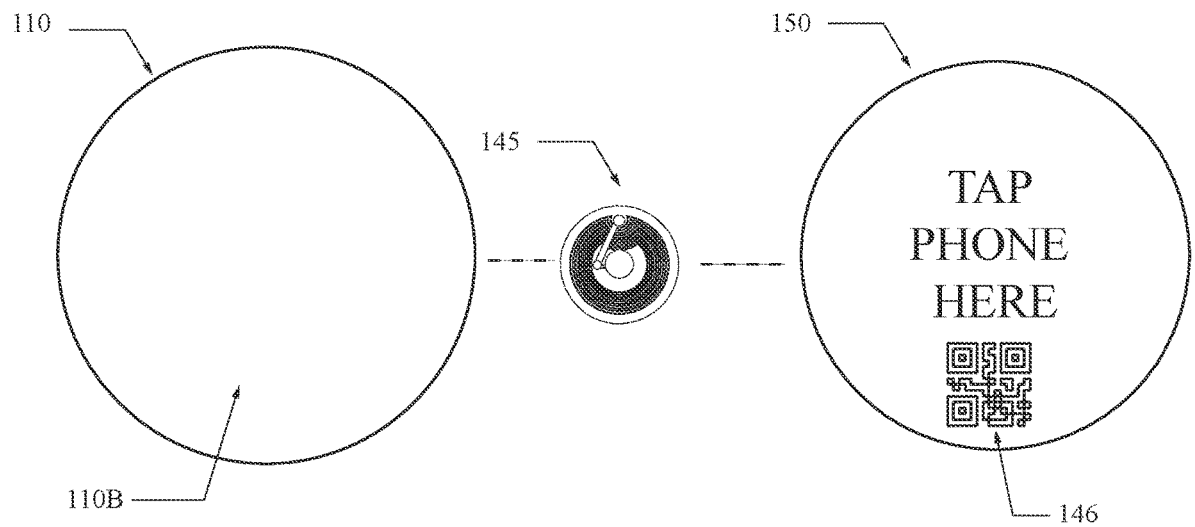
FIG. 6A shows an exemplary isometric view of one embodiment of the removable element of the interactive beverage system and method.
Figure 6B:
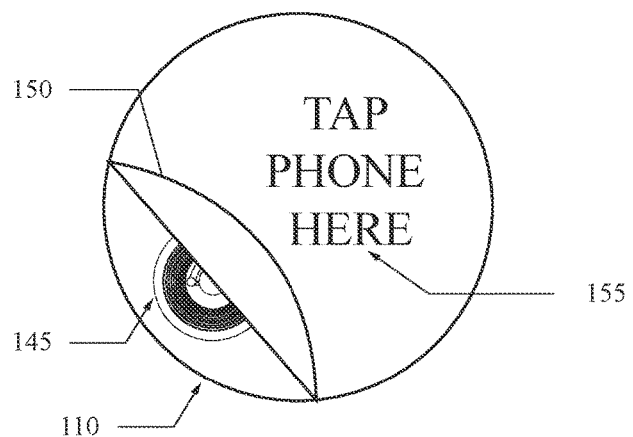
FIG. 6B shows an exemplary isometric view of one embodiment of the removable element of the interactive beverage system and method.

FIG. 5B further illustrates an element top surface 110A and an element bottom surface 110B of the removable element 110. In an exemplary embodiment shown in FIG. 6A, the linking article 145 is adjoined to the element bottom surface 110B of the removable element 110 and further, a sticker 150 is applied over the linking article 145 and onto the element bottom surface 110B. The sticker 150 further comprises a visual identifier 155. In the exemplary embodiment, the visual identifier 155 comprises a line of text stating "TAP PHONE HERE" to visually communicate to the user 195 where to position the digital processing device 2501 in order for the processor of the digital processing device 2501 to read the unique identifier of the linking article 145 and begin transmission of the input. Additionally, as displayed in FIG. 6A a secondary linking article 146 is shown, embodied as a QR code. The interactive beverage system 100 may comprise any number, without limitation, of the linking article 145 or the secondary linking article 146. The exemplary purpose of the secondary linking article 146 being an alternative route for the digital processing device 2501 to receive the input from the secondary linking article in the event that the linking article 145 is unreadable by the digital processing device 2501. In doing so, the secondary linking article 146 gives more reliability to the interactive beverage system 100 and helps ensure that the user 195 does engage with the beverage data 141 on the digital processing device 2501 of the user 195.

Figure 7:
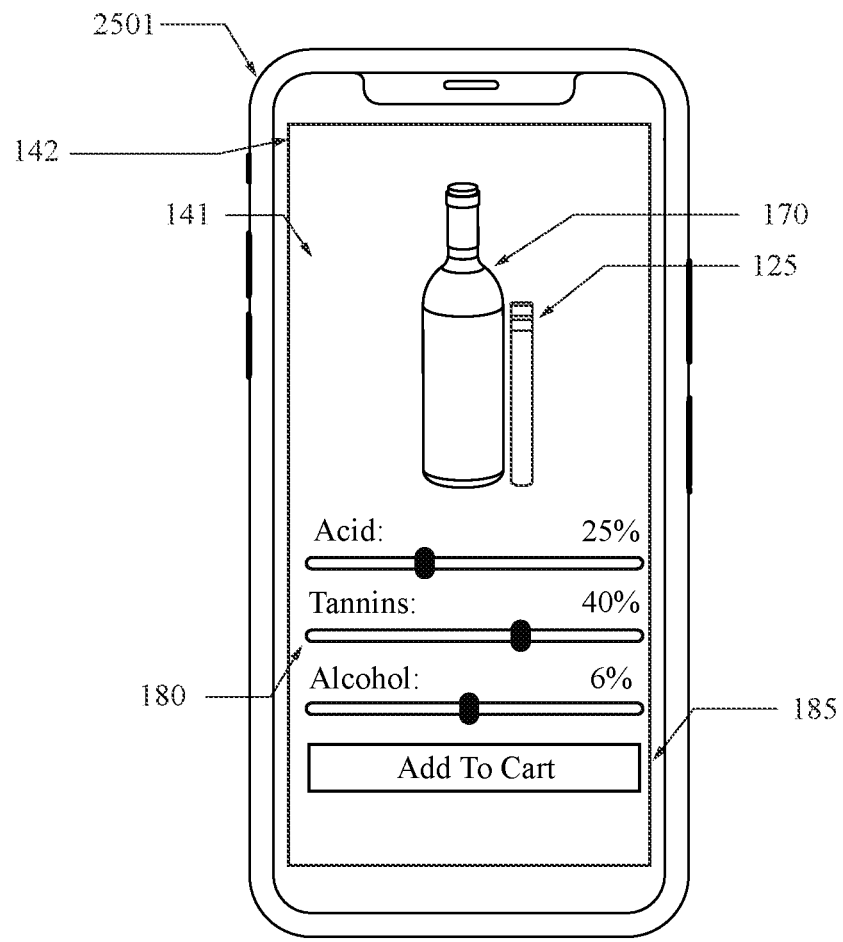
FIG. 7 shows an exemplary front view of one embodiment of the digital processing device and beverage data of the interactive beverage system and method.
Figure 8:
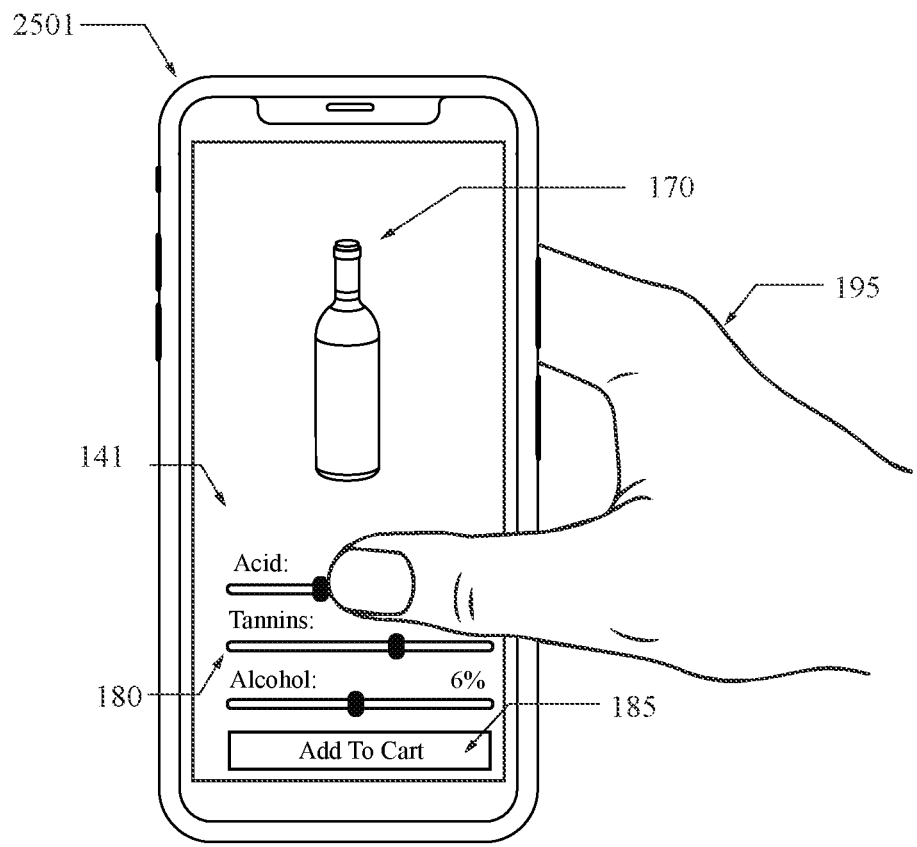
FIG. 8 shows an exemplary front view of one embodiment of the digital processing device and beverage data of the interactive beverage system and method.

As shown in FIG. 7 and FIG. 8, a display screen 142 of the digital processing device 2501 is shown for communication of the beverage data 141 to the user 195 after interaction with the linking article 145. An exemplary embodiment of the beverage data 141 is shown in FIG. 7 and FIG. 8, having an image of the beverage 170 and the beverage sample 125 shown. Further, within the exemplary embodiment of the beverage data 141 a variable input 180 is shown wherein the user 195 may interact and adjust the beverage data 141 displayed to the user 195 based on their consumption of the beverage 170 or the beverage sample 125. A purchase button 185 is shown in FIG. 7, wherein the user 195 may additionally purchase more of the beverage 170 or the beverage sample 125. FIG. 8 further illustrates an embodiment wherein the display screen 142 of the digital processing device 2501 is embodied as a touch screen wherein the user 195 may use contact of a hand of the user 195 to adjust the beverage data 141 as desired by the user 195. The display screen 142 of the digital processing device 2501 may include, without limitation, at least one or any combination of: 5-wire resistive, surface capacitive touch, projected capacitive (P-Cap), SAW (surface acoustic wave), and IR (infrared) touchscreens.

Figure 9:
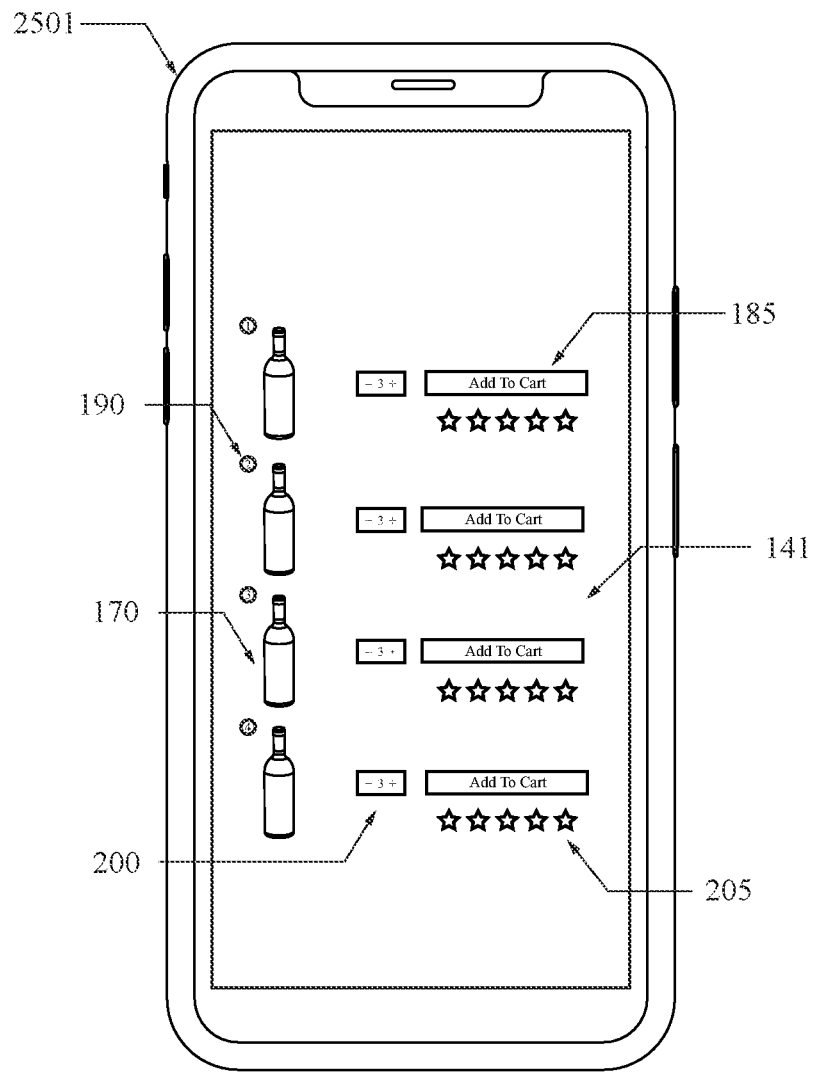
FIG. 9 shows an exemplary front view of one embodiment of the digital processing device and beverage data of the interactive beverage system and method.
Figure 10:
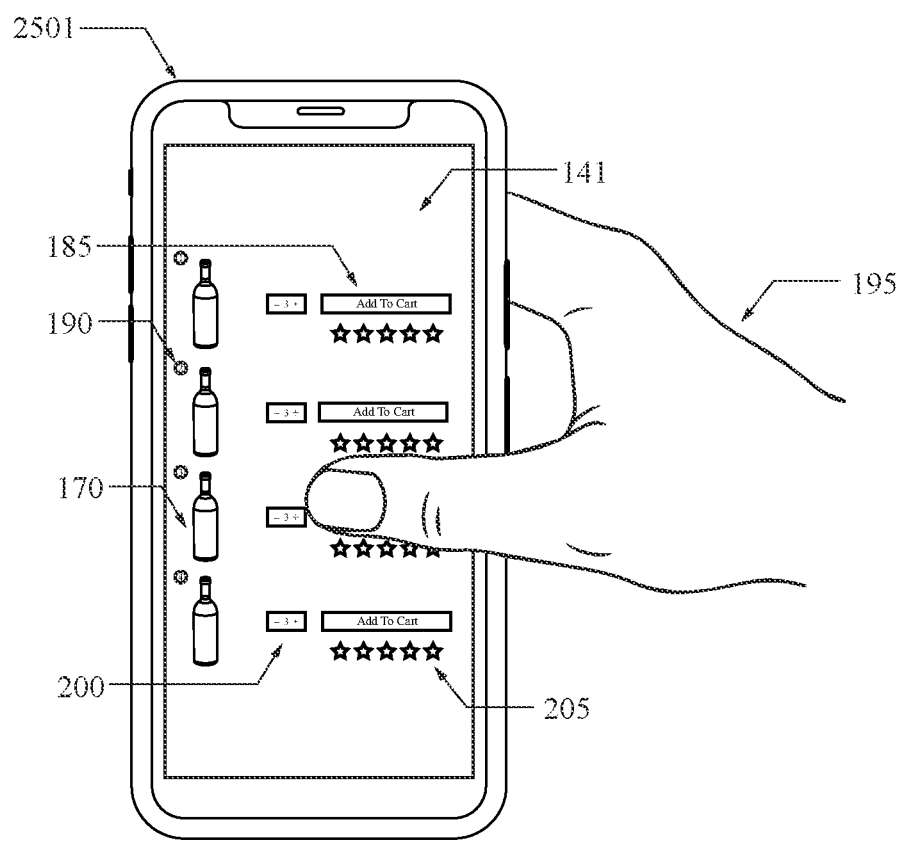
FIG. 10 shows an exemplary front view of one embodiment of the digital processing device and beverage data of the interactive beverage system and method.

As illustrated in FIG. 9 and FIG. 10, an exemplary embodiment of the display screen 142 of the digital processing device 2501 is shown for communication of a beverage data 141 to the user 195 after interaction with the linking article 145. An exemplary embodiment of the beverage data 141 is shown in FIG. 9 and FIG. 10, having a rating system 205 wherein the user 195 may input a preferential rating of the beverage 170. In the current exemplary embodiment, the rating system 205 is shown as a 0-5 star rating. In use with the interactive beverage system 100 a customer profile may be established to record and document the beverage data 141, the time stamp, the unique identifier or other data associated with the beverage 170, the beverage sample 125 or the user 195 of the interactive beverage system 100. In other embodiments, the customer profile may record information regarding the trends and attributes of the user 195 with respect to one or more beverages 170 or retailers of the beverage 170, such as a record of past transactions. Further, this may involve accessing stored information via a network or the memory of the digital processing device 2501, without limitation. Further, the digital processing device 2501 may access and associate other data with the customer profile such as prior transactions of the user with the retailer (or the beverage manufacturer), derived data, products previously purchased by the user 195, information from the rating system 205 or any other type of information that can be of use by the retailer of the beverage within the interactive beverage system 100 to improve the experience of the user 195. Those skilled in the art will recognize the trends and attributes of the user 195 that may be useful in re-marketing to the user 195 similar beverages to the beverage 170 or beverage sample 125 of the interactive beverage system 100, such as, tasting profile preferences, pricing sensitivity, gender demographics, age demographics, income, ZIP code, home ownership, market value of home, gender, marital status, and the like.

Figure 11:
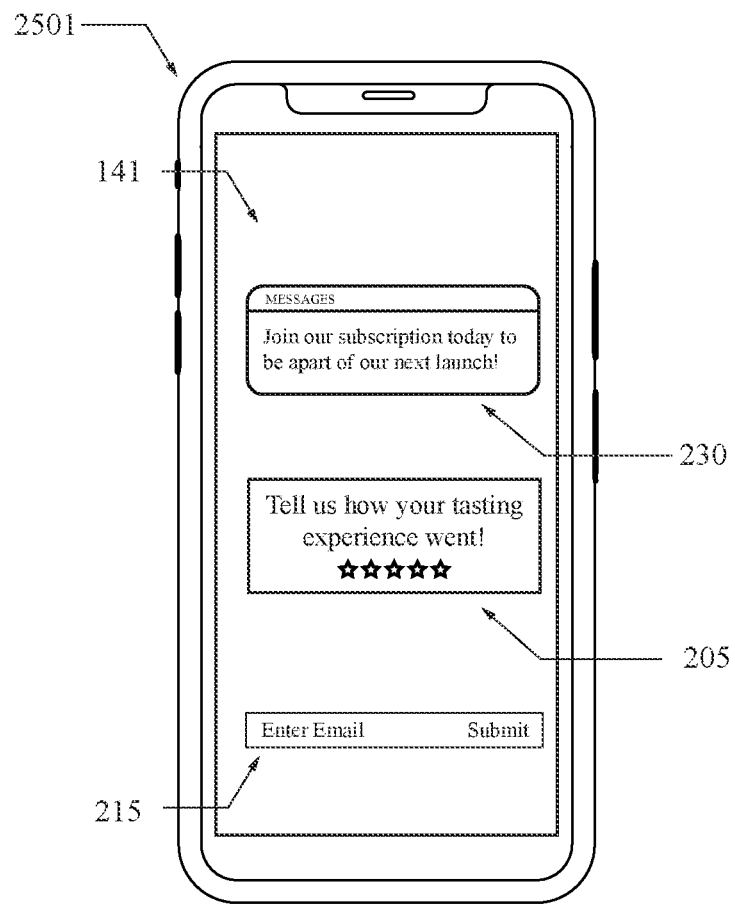
FIG. 11 shows an exemplary front view of one embodiment of the digital processing device and beverage data of the interactive beverage system and method.
Figure 12:
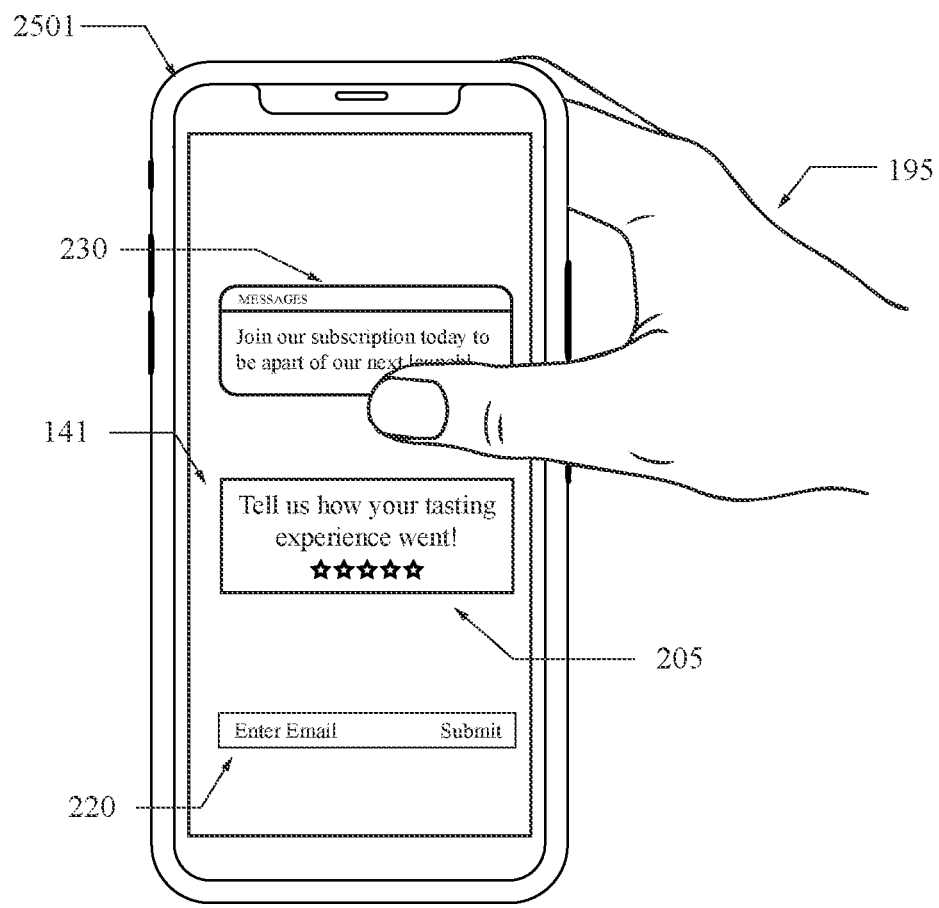
FIG. 12 shows an exemplary front view of one embodiment of the digital processing device and beverage data of the interactive beverage system and method.

As shown in FIG. 11 and FIG. 12, the display screen 142 of the digital processing device 2501 is shown displaying the rating system 205, a prompt 210, and a data entry field 215 on the beverage data 141 to the user 195. In use with the current invention, the user 195 may be provided with a sales data 230 such as a purchase suggestion, SMS messages and emails to collect further trends and attributes of the user 195 for encouraging further purchasing. The sales data 230 and interactions with, may also be associated with the customer profile. The prompt 210, the sales data 230, the beverage data, or the data entry field 215 may be delivered to the user 195 on their digital processing device 2501 at a predetermined time. For example, the sales data 230 may be dependent on the time stamp recorded when the input is received by the digital processing device 2501 or the central server computer. In exemplary use, without limitation, the sales data 230 may be transmitted 24 hours after the time stamp has been recorded in order to push the user 195 to purchase more of the beverage 170. Once the user 195 has consumed the beverage 170 or the beverage sample 125 associated with the interactive beverage system 100 one skilled in the art will recognize the best times to remarket to the user 195.

Figure 13:
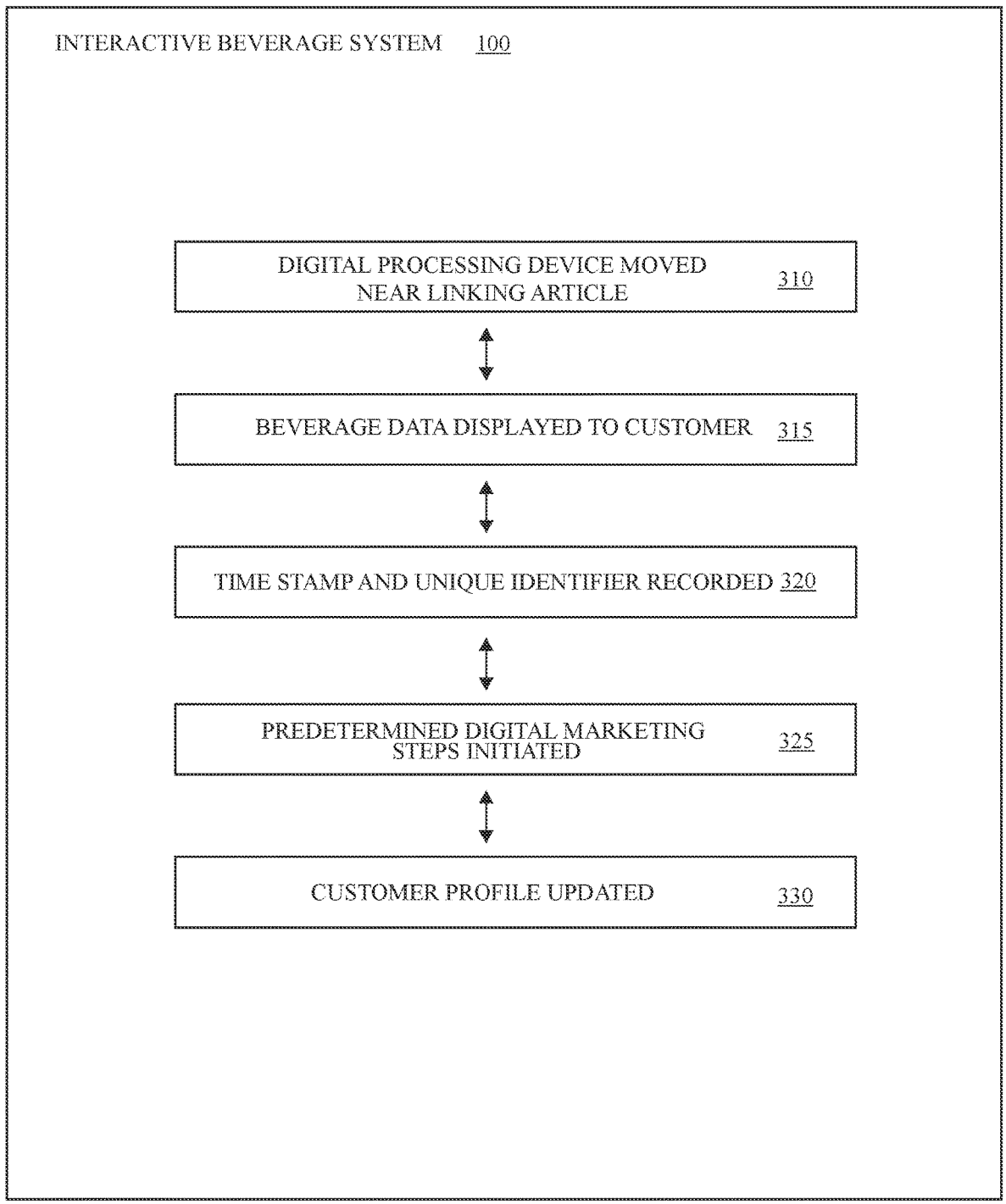
FIG. 13 shows an exemplary flowchart illustrating the interactive beverage system and method.

In FIG. 13 an exemplary flowchart is shown illustrating the use of the interactive beverage system 100. In the exemplary method illustrated in FIG. 13, the user 195 begins with step 310 and passes to step 330. In step 310 the user positions the digital processing device 2501 near the linking article 145 causing step 315 to occur. During step 315 the user 195 is shown a beverage data 141 while the processor of the digital processing device 2501 or of the central server computer conducts step 310 to record to the memory or to the network the time stamp or the unique identifier associated with the input from the linking article 145. Next, step 325 is begun wherein a sales data 230 is triggered, causing predetermined digital marketing steps to be initiated and displayed to the user 195. Last, in step 330 the customer profile, as described above, is updated. In other embodiments, the user 195 must first interact with the prompt 210 before the beverage data 141 associated with at least one beverage sample 125 is displayed. For example, the prompt 210 may comprise an age-verification protocol to ensure the age of the user 195.

As the user further interacts with the beverage data 141 further transactions of the beverage 170 or the beverage sample 125 may occur. When further transactions occur the sales data 230 may be received or transmitted from the digital processing device 2501, the network or the central server computer. In some embodiments, the sales data 230 is at least one or a combination of: a digital advertisement, a push notification, a request entry of a personal information by the user, an image, a SMS message or an email. In other embodiments, one skilled in the art with recognize methods wherein the unique identifier or the input of the linking article 145 may change over time in accordance with an algorithm used to encode the unique identifier of the linking article 145. For example, after a duration of one month the input or the unique identifier of the linking article 145 may guide the user to a different embodiment of the beverage data 141 or new URL as the previously displayed version of the beverage data 141 is now outdated.

Figure 17:
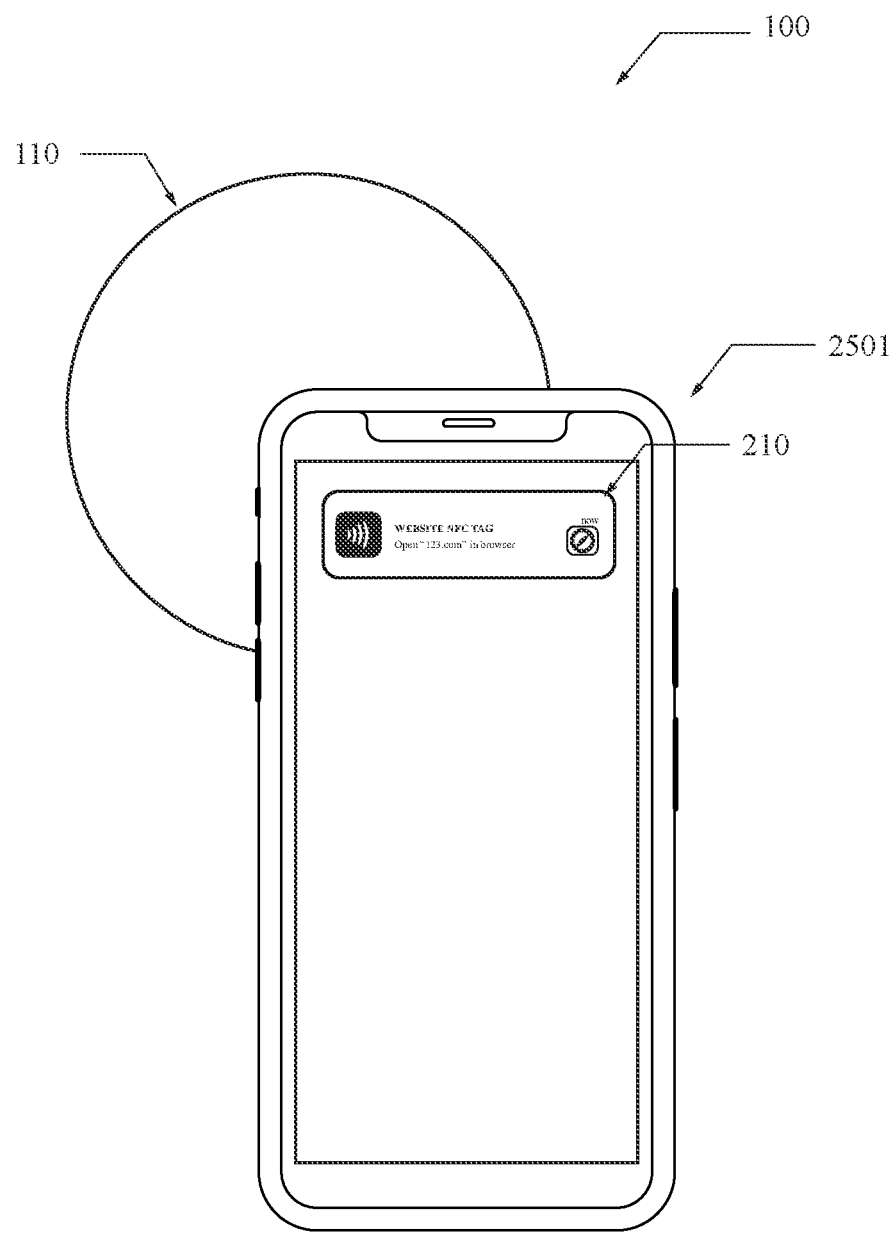
FIG. 17 shows an exemplary top view of one embodiment of the interactive beverage system and method.

In FIG. 17 the digital processing device 2501 is shown displaying the prompt 210 to the user 195 after interaction with the removable element 110, having the linking article 145 within. As illustrated, the prompt 210 may match the native user interface and graphic design of the manufacturer of the digital processing device such as Apple® iOS®, Google® or Android®.

Figure 18:
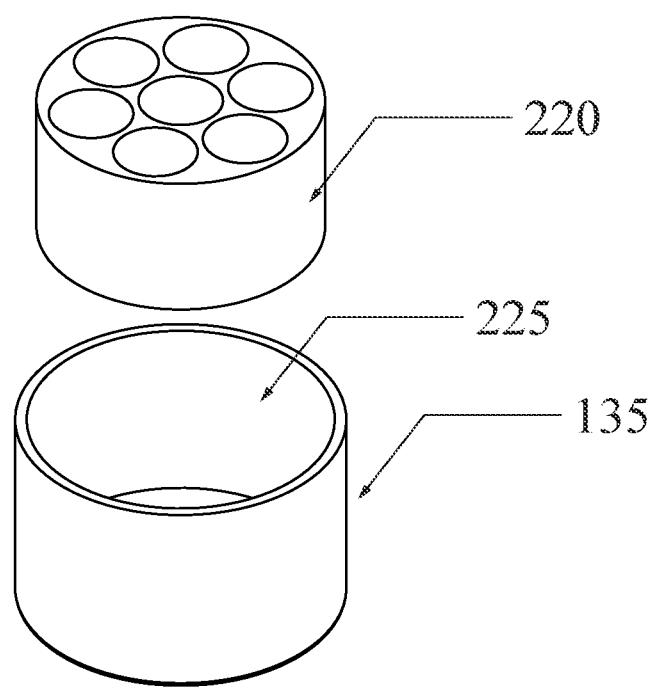
FIG. 18 shows an exemplary isometric view of one embodiment of the interactive beverage system and method.
Figure 19:
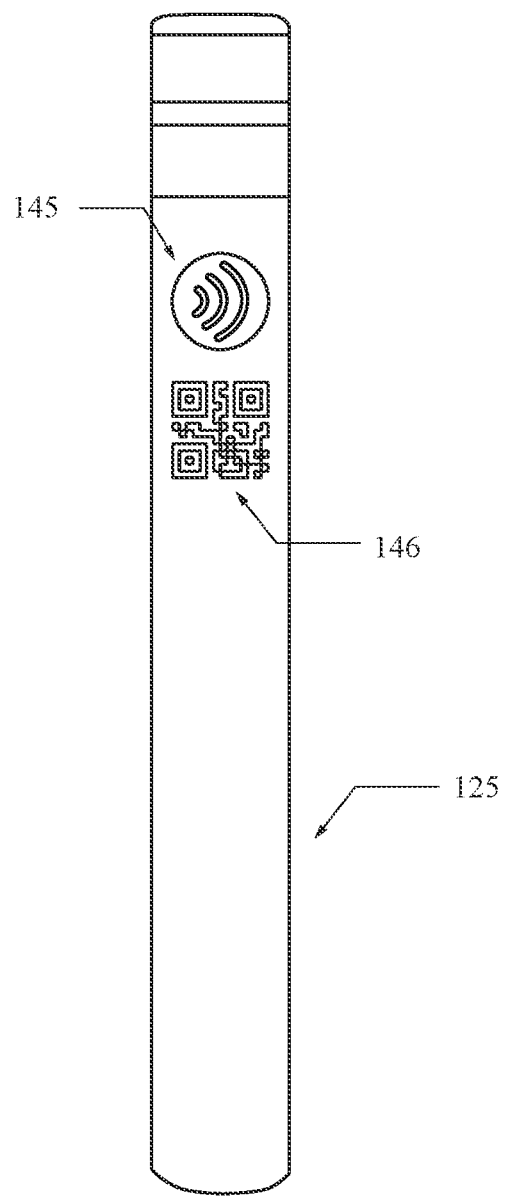
FIG. 19 shows an exemplary front view of one embodiment of the beverage sample of the interactive beverage system and method.
Figure 20:
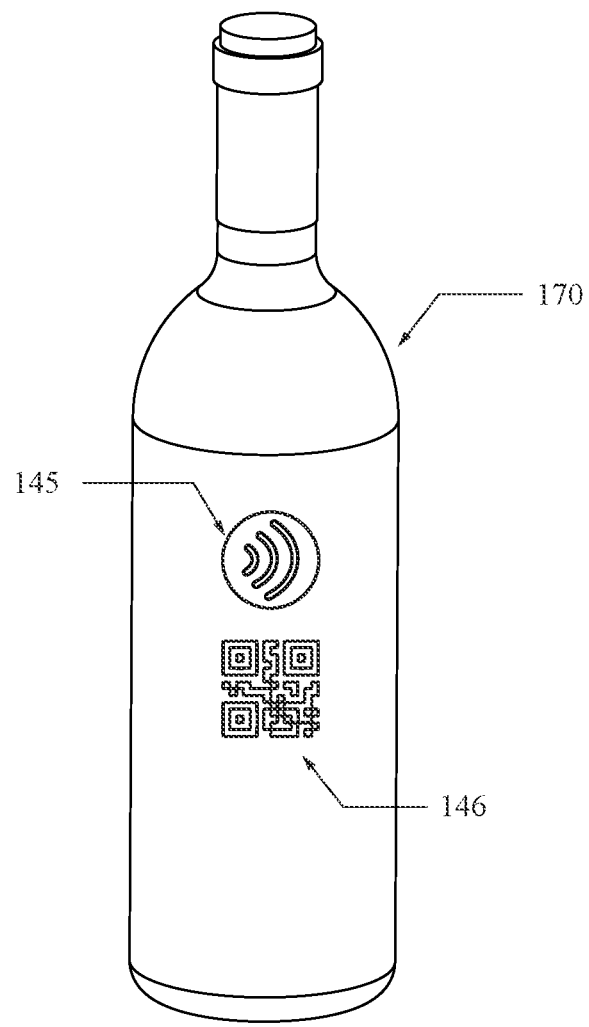
FIG. 20 shows an exemplary front view of one embodiment of the beverage of the interactive beverage system and method.

As shown in FIG. 18, in some embodiments, the lower portion 135 further comprises a lower insert 220 within a lower portion aperture 225 extending into the lower portion 220. The lower insert 220 being removable and interchangeable. As shown in FIGS. 19 and 20, in some embodiments, the beverage sample 125 or the beverage 170 further comprise one or more of the linking article 145, the secondary linking article 146 or the visual identifier 155 of the system 100.

In some embodiments, the digital processing device 2501 may be configured to initiate or receive the input. The system 100 may comprise 1, 2, 3, 4, 5, 6, 7, 8, 9, 10, or more inputs. The digital processing device 2501 may comprise a touchscreen, a button, a camera, a microphone, an input port, or any combination thereof. In some embodiments, the present invention includes a mobile application to be used in relation to the linking article of the capsule. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK. Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the mobile application is provided to a mobile digital processing device at the time it is manufactured. In other embodiments, the mobile application is provided to a mobile digital processing device via the computer network described herein. In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Digital Processing Device

In some embodiments, the platforms, systems, media, and methods described herein include a digital processing device 2501, or use of the same. In further embodiments, the digital processing device 2501 includes one or more hardware central processing units (CPUs) or general purpose graphics processing units (GPGPUs) that carry out the device's functions. In still further embodiments, the digital processing device 2501 further comprises an operating system configured to perform executable instructions. In some embodiments, the digital processing device 2501 is optionally connected a computer network. In further embodiments, the digital processing device 2501 is optionally connected to the Internet such that it accesses the World Wide Web. In still further embodiments, the digital processing device 2501is optionally connected to a cloud computing infrastructure. In other embodiments, the digital processing device 2501is optionally connected to an intranet. In other embodiments, the digital processing device 2501 is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS x®, UNIX®, and UNIX-like operating systems such as GNU/Linux®. In some embodiments, the operating system is provided by cloud computing.

Those of skill in the art will also recognize that suitable mobile smart phone operating systems include, by way of non-limiting examples, Nokia® Symbian® OS, Apple® iOS®, Research In Motion® BlackBerry os®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3 ®, Sony® PS4 ®, Microsoft® Xbox 360®, Microsoft Xbox One, Nintendo® Wii®, Nintendo® Wii u®, and Ouya®.

In some embodiments, the digital processing device 2501 includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In exemplary user, the storage and/or memory device of the digital processing device 2501 may store the beverage data, time stamp or other data associated with the interactive beverage system and method 100.

In other embodiments, the system and method 100 includes a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device 2501 includes a display screen to send visual information to a user or viewer of the real-time compressed video stream. In some embodiments, the display screen is a liquid crystal display (LCD). In further embodiments, the display is a thin film transistor liquid crystal display screen (TFT-LCD). In some embodiments, the display screen is an organic light emitting diode (OLED) display screen. In various further embodiments, on OLED display is a passive-matrix OLED (PMOLED) or active-matrix OLED (AMOLED) display. In some embodiments, the display screen is a plasma display. In other embodiments, the display screen is a video projector. In yet other embodiments, the display screen is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOYE VR, Zeiss VR One, A vegant Glyph, Freefly VR headset, and the like. In still further embodiments, the display screen is a combination of devices such as those disclosed herein.

In some embodiments, the digital processing device 2501 includes an input device 200 to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 14:
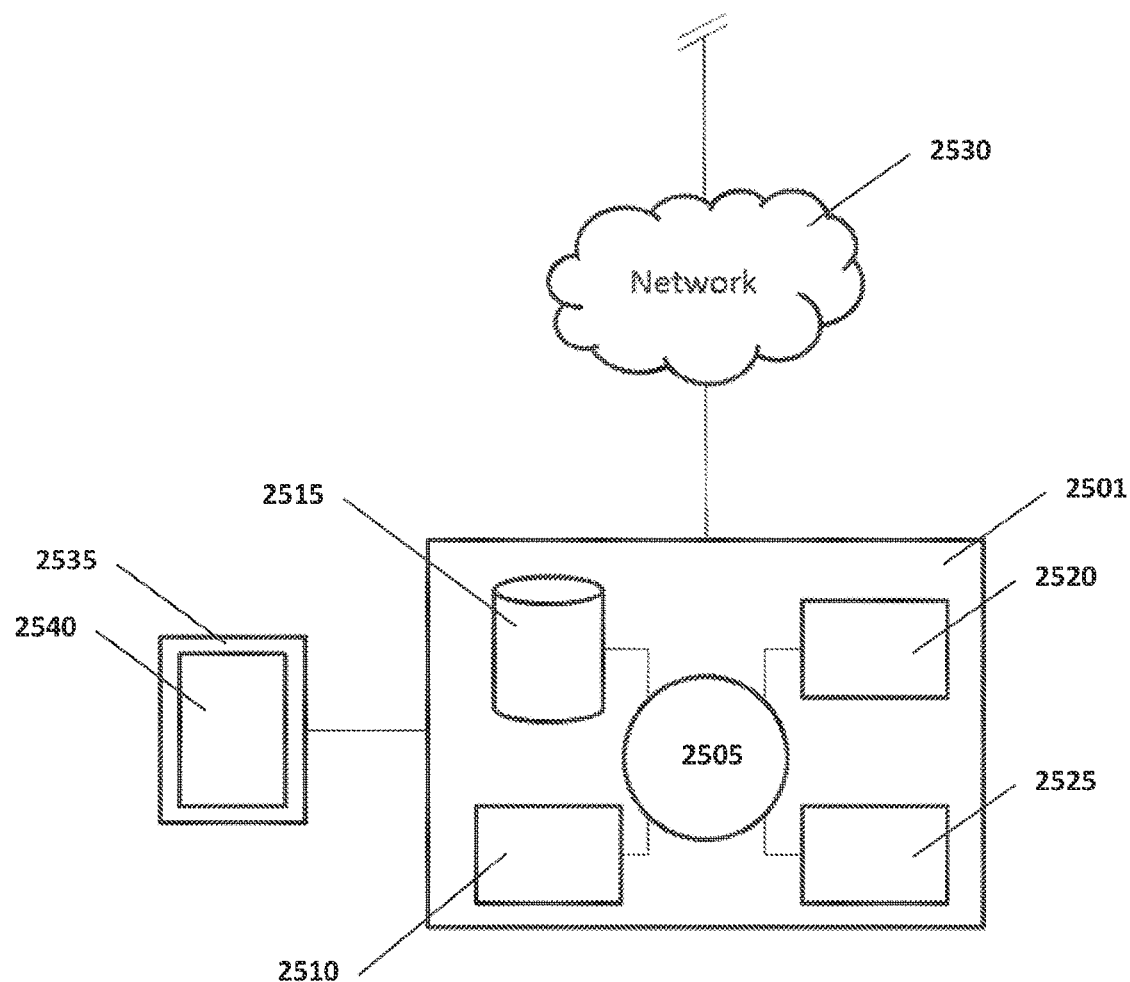
FIG. 14 shows a non-limiting example of a digital processing device; in this case, a device with one or more CPUs, a memory, a communication interface, and a display.
Figure 15:
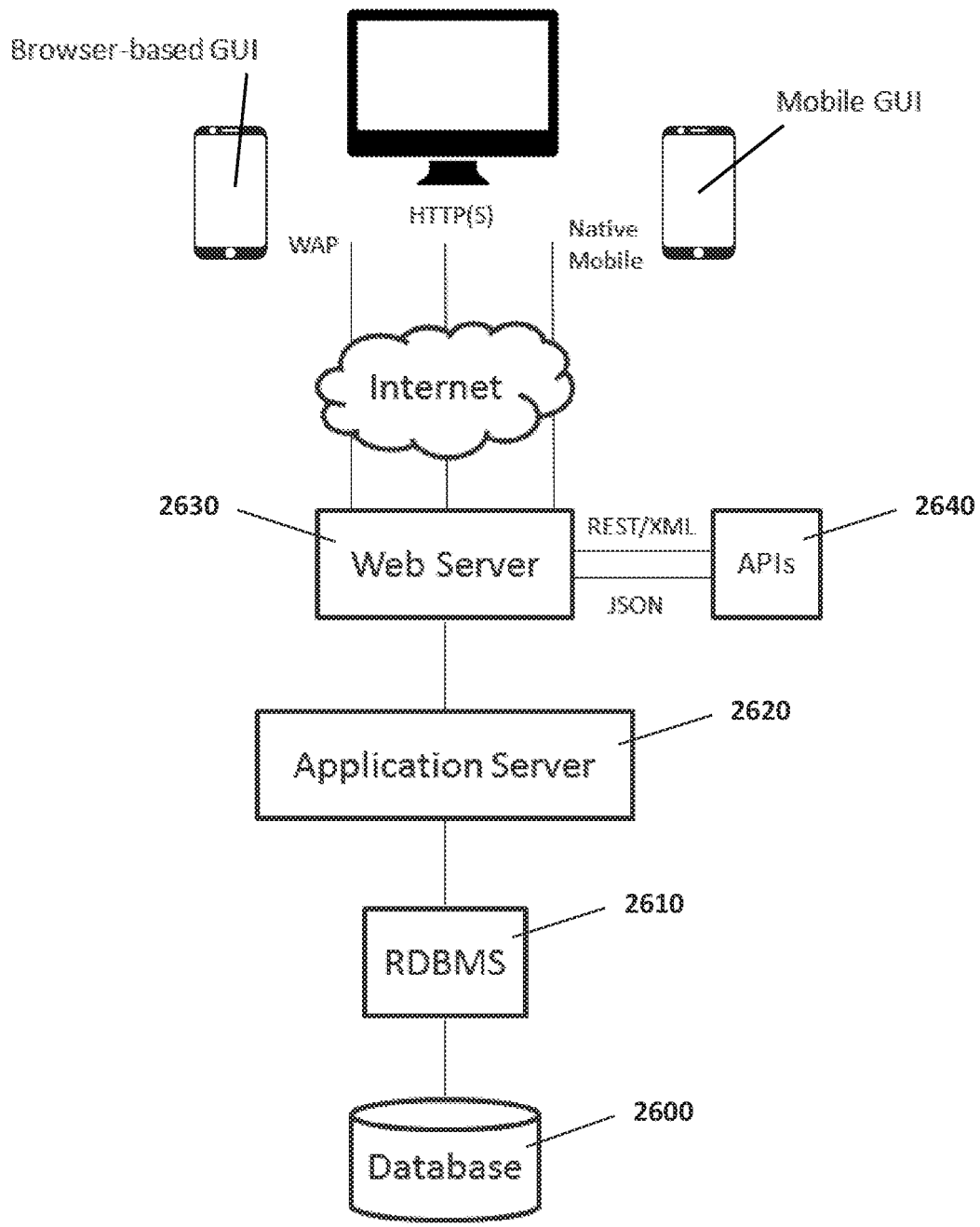
FIG. 15 shows a non-limiting example of a web/mobile application provision system; in this case, a system providing browser-based and/or native mobile beverage datas.
Figure 16:
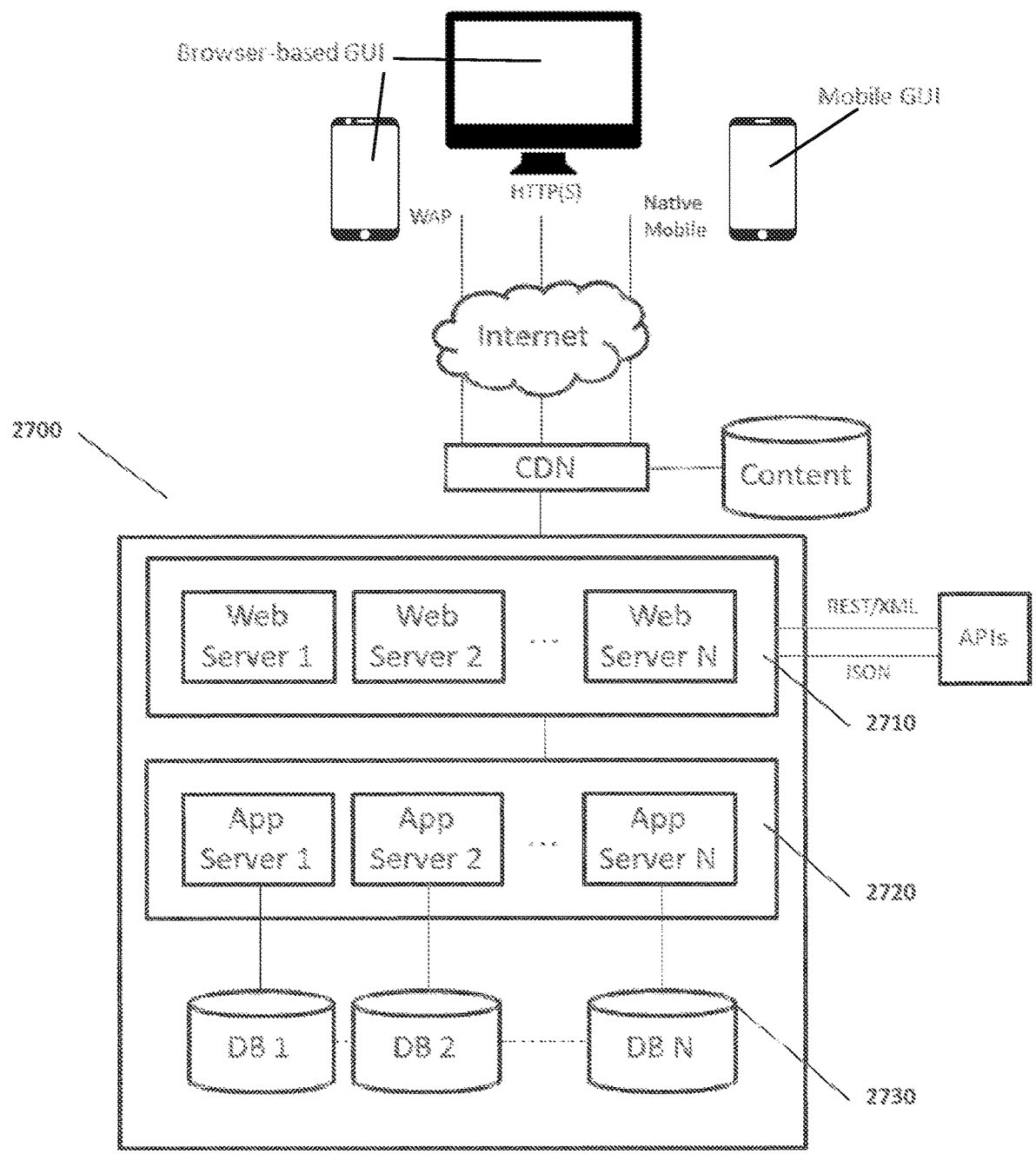
FIG. 16 shows a non-limiting example of a cloud-based web/mobile application provision system; in this case, a system comprising an elastically load balanced, auto-scaling web server and application server resources as well as synchronously replicated databases.

Referring to FIG. 14-16, in a particular embodiment, a digital processing device 2501 is programmed or otherwise configured to display at least one of or any combination of: the prompt 210, the sales data 230, or the beverage data 141. The device 2501 is programmed or otherwise configured to control the broadcast the sporting event. In this embodiment, the digital processing device 2501 includes a central processing unit (CPU, also "processor" and "computer processor" herein) 2505, which is optionally a single core, a multi core processor, or a plurality of processors for parallel processing. The digital processing device 2501 also includes memory or memory location 2510 (e.g., random-access memory, read-only memory, flash memory), electronic storage unit 2515 (e.g., hard disk), communication interface 2520 (e.g., network adapter) for communicating with one or more other systems, and peripheral devices 2525, such as cache, other memory, data storage and/or electronic display adapters. The memory 2510, storage unit 2515, interface 2520 and peripheral devices 2525 are in communication with the CPU 2505 through a communication bus (solid lines), such as a motherboard. The storage unit 2515 comprises a data storage unit (or data repository) for storing data. The digital processing device 2501 is optionally operatively coupled to a computer network ("network") 2530 with the aid of the communication interface 2520. The network 2530, in various cases, is the internet, an internet, and/or extranet, or an intranet and/or extranet that is in communication with the internet. The network 2530, in some cases, is a telecommunication and/or data network. The network 2530 optionally includes one or more computer servers, which enable distributed computing, such as cloud computing. The network 2530, in some cases, with the aid of the device 2501, implements a peer-to-peer network, which enables devices coupled to the device 2501 to behave as a client or a server.

Continuing to refer to FIG. 14-16, a processor 2505 or CPU is configured to execute a sequence of machine-readable instructions, embodied in a program, application, and/or software. The instructions are optionally stored in a memory location, such as the memory 2510. The instructions are directed to the CPU 2505, which subsequently program or otherwise configure the CPU 2505 to implement methods of the present disclosure. Examples of operations performed by the CPU 2505 include fetch, decode, execute, and write back. The CPU 2505 is, in some cases, part of a circuit, such as an integrated circuit. One or more other components of the device 2501 are optionally included in the circuit. In some cases, the circuit is an application specific integrated circuit (ASIC) or a field programmable gate array (FPGA).

Continuing to refer to FIG. 14-16, the storage unit 2515 optionally stores files, such as drivers, libraries and saved programs. The storage unit 2515 optionally stores user data, e.g., user preferences and user programs. The digital processing device 2501, in some cases, includes one or more additional data storage units that are external, such as located on a remote server or the central server computer that is in communication through an intranet or the internet.

Continuing to refer to FIG. 14-16, the digital processing device 2501 optionally communicates with one or more remote computer systems through the network 2530. For instance, the device 2501 optionally communicates with a remote computer system of a user. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. Methods, as described herein, are optionally implemented by way of machine (e.g., computer processor) executable code stored on an electronic storage location of the digital processing device 2501, such as, for example, on the memory 2510 or electronic storage unit 2515. The machine executable or machine readable code is optionally provided in the form of software. During use, the code is executed by the processor 2505. In some cases, the code is retrieved from the storage unit 2515 and stored on the memory 2510 for ready access by the processor 2505. In some situations, the electronic storage unit 2515 is precluded, and machine-executable instructions are stored on the memory 2510.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's processor or CPU, written to perform a specified task.

Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plugins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Referring to FIG. 15, in a particular embodiment, an application provision system comprises one or more databases 2600 accessed by a relational database management system (RDBMS) 2610. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application servers 2620 (such as Java servers, .NET servers, PHP servers, and the like) and one or more web servers 2630 (such as Apache, IIS, GWS and the like). The web server(s) optionally expose one or more web services via app application programming interfaces (APIs) 2640. Via a network, such as the internet, the system provides browser-based and/or mobile native beverage datas.

Referring to FIG. 16, in a particular embodiment, an application provision system alternatively has a distributed, cloud-based architecture 2700 and comprises elastically load balanced, auto-scaling web server resources 2710 and application server resources 2720 as well synchronously replicated databases 2730.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In view of the disclosure provided herein, those of skill in the art will recognize that several plug-in frameworks are available that enable development of plug-ins in various programming languages, including, by way of non-limiting examples, C++, Delphi, Java™, PHP, Python™ and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for weighing and releasing an item. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet based. In further embodiments, a database is web-based. In still further embodiments, a database is cloud computing-based. In other embodiments, a database is based on one or more local computer storage devices.

In reference to FIGS. 1 through 20, the present invention may include the following elements:
  a capsule 101
  an interactive beverage system 100
  a removable element 110
  an indentation 115
  an upper portion 120
  a beverage sample 125
  an aperture 130
  a lower portion 135
  a distal portion POS.1A
  a proximal position POS.1B
  a beverage data 141
  a display screen 142
  a linking article 145
  a secondary linking article 146
  an element top surface 110A
  an element bottom surface 110B
  a sticker 150
  a visual identifier 155
  an upper length 160
  a lower length 165
  an alignment protrusion 166
  a beverage 170
  a variable input 180
  a purchase button 185
  a beverage indicator 190
  a user 195
  a rating system 205
  a prompt 210
  a data entry field 215
  a lower insert 220
  a lower portion aperture 225
  a digital processing device 2501
  a processor 2505
  a memory 2510
  a storage unit 2515
  a communication interface 2520
  a peripheral device 2525
  a network 2530
  a database 2600
  a relational database management system 2610
  an application server 2620
  a web server 2630
  a app application programming interfaces 2640
  a cloud—based architecture 2700
  a auto—scaling web server resources 2710
  a application server resources 2720
  a synchronously replicated database 2730

As used in this application, the term "a" or "an" means "at least one" or "one or more."

All references throughout this application to the system 100 being intended for use with the beverage 170 or the beverage sample 125 are in no way limiting to the scope of the present invention. The system 100 may be used in conjunction with other consumable products such as food, consumer products, services, or electronic products.

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method comprising:
   providing a user with at least one sample of a beverage within a capsule;
   adjoining a linking article having a unique identifier to the capsule;
   receiving by a processor of a digital processing device, a input from the linking article to initialize presentation of a beverage data to the user on a display screen of the digital processing device;
   recording, a time stamp when the input is received by the digital processing device or the central server computer; and,
   transmitting by the processor the unique identifier to a central server computer.

2. The method of claim 1, further comprising:
   initializing, a prompt on the display screen of the digital processing device; and
   wherein the user must first interact with the prompt before the beverage data associated with at least one sample is displayed.

3. The method of claim 2, wherein the prompt is an age-verification protocol to ensure a age of the user.

4. The method of claim 1, wherein the beverage data comprises at least one or a combination of: text, images, HTML, a URL, a program, a sequence of instructions or executable code.

5. The method of claim 1 further comprises:
   transmitting, a sales data from the central server computer to the digital processing device at a predetermined time.

6. The method of claim 5, wherein the sales data is at least one or a combination of: an digital advertisement, a push notification, a request entry of a personal information by the user, an image, a SMS message and an email.

7. The method of claim 5, wherein the predetermined time is dependent on a time stamp recorded when the input is received by the digital processing device or the central server computer.

8. The method of claim 1, wherein the adjoining of the linking article is removable.

9. The method of claim 1 further comprises:
   associating, a customer profile with the unique identifier.

10. The method of claim 1 further comprises:
    determining, a measure of location based on the digital processing device.

11. The method of any of claim 1, wherein the unique identifier or the input of the linking article changes over time in accordance with an algorithm used to encode the unique identifier.

12. A beverage package system, comprising:
    a capsule having an upper portion removably adjoined to a lower portion;
    at least one aperture extending into the lower portion;
    at least one beverage sample of a beverage positioned within the at least one aperture;
    a linking article adjoined to the capsule and having a unique identifier;
    a digital processing device having a display screen; and,
    wherein a user positions the digital processing device near the linking article to display a a beverage data or a prompt on the display screen associated with the at least one beverage sample.

13. The beverage package system of claim 12, wherein the linking article is removable.

14. The beverage package system of claim 12, wherein the linking article is circular.

15. The beverage package system of claim 12, wherein the capsule is cylindrical.

16. The beverage package system of claim 12, wherein the at least one beverage sample is cylindrical.

17. The beverage package system of claim 12, wherein the beverage sample is about 50 ml or 100 ml.

18. The beverage package system of claim 12, wherein a upper length of the upper portion is greater than a lower length the lower portion.

19. The beverage package system of claim 12, wherein the linking article is at least one or a combination of: a NFC tag, a QR code, a wife module, a Bluetooth module, a URL, or a RFID tag.

* * * * *